Nov. 24, 1942.     C. E. SWENSON     2,303,180
POWER TAKE-OFF JOINT ASSEMBLY
Filed May 29, 1941

Inventor:
Carl E. Swenson
By McCanna, Wintercorn & Morsbach
Attys.

Patented Nov. 24, 1942

2,303,180

UNITED STATES PATENT OFFICE 2,303,180

POWER TAKE-OFF JOINT ASSEMBLY

Carl E. Swenson, Rockford, Ill.

Application May 29, 1941, Serial No. 395,731

10 Claims. (Cl. 180—14)

This invention relates to power take-off assemblies for tractors and similar devices for use in driving vehicles trailed therebehind, and has special reference to a universal joint mechanism for driving a driven shaft connected to said vehicle, together with means for supporting the same and controlling the operation thereof. This is a continuation in part of my copending application Serial No. 359,017, filed September 30, 1940.

Substantial difficulty is now encountered in the field of power-driven farm implements, and doubtless in numerous other analogous fields, due to the difficulty in connecting the implement to a tractor. There is wide variation between the tractors of different manufacturers, in the relative locations of the power take-off shaft and the hitch point, these differences doubtless being due to differences in structure and design of the tractor mechanism. As a result of these variations, it is necessary for each manufacturer of power-driven implements to provide a wide variety of tow bar and implement drive mechanism designed to fit the implement to different tractors. This requires the manufacturer and dealer to stock a large number of parts for attachment of each vehicle to the different tractors, and results in considerable confusion and a substantial amount of trial and error in adapting the implement to any given tractor. Furthermore, it requires the user to have on hand a substantial number of different assemblies for use on different implements. These difficulties arise from the necessity of maintaining the universal joints of the drive mechanism and the pivot point of the hitch mechanism in certain relationships to give substantially constant angular velocity to the shafts when using the Cardon type joints ordinarily used, and the necessity for supporting the shaft connecting the tractor with the implement.

An important object of the invention is the provision of a power take-off assembly supported wholly upon the tractor, and in effect forming a part thereof so arranged that the pivot pin of the draw bar can be located at any convenient place at the rear of the tractor, the assembly forming in effect a continuation of the power take-off shaft to provide a power take-off shaft capable of driving at any angularity with respect to the tractor within the normal range of operation, such that a uniform drive shaft and tow bar construction can be used on the trailing implement.

Another important object of the invention is the provision in a tractor of a power take-off assembly of novel and improved construction adapted to effectively become a part of the tractor.

I have also aimed to provide a power take-off mechanism including a pair of close coupled universal joints in which the rear end of the mechanism is supported in fixed relationship with the driven shaft, wherein the joints are supported so that the angularity between the shafts is substantially equally divided between the two joints to give substantially constant angular velocity to the driven shaft, and wherein a sliding driving connection is provided between the forward end of the mechanism and the tractor shaft to accommodate for differences due to angularity between said shafts.

A further object of the invention is the provision of a power take-off mechanism including close coupled universal joints wherein the mechanism is supported on a vertical axis in a bearing occupying a fixed relation with respect to the driving shaft and is pivotally supported on a horizontal axis disposed rearwardly of the pivot plane of the rear universal joint, and a slidable driving connection is provided between the drive shaft of the tractor and the front universal joint.

A still further object of the invention is the provision in a tractor of power take-off mechanism wherein novel supporting means is provided to impart greater rigidity to said mechanism against lateral force and to reduce the chatter or vibration due to angularity of the shafts.

In order to transmit uniform angular motion from a driving to a driven shaft, two closely coupled universal joints may be employed together with means for maintaining the angularity of the two joints substantially equal, and it is an object of the invention to provide in a tractor, such a combination wherein the joints are supported for angular movement on a vertical axis forwardly of the center of the coupling member and on a horizontal axis disposed rearwardly of the center of the rear joint whereby to obtain maximum angular movement between the shafts and at the same time obtain substantially constant angular velocity of the driven shaft and the maximum rigidity of support.

A still further object of the invention is the provision of a joint assembly wherein the rear joint and the supporting bearing therefor are supported in fixed relation to both the vertical and horizontal axes to make the joint assembly entirely independent of the trailing implement.

A further object of the invention is the provision of a power take-off joint assembly for tractors wherein the joints are supported for rotation and angular movement at a point adjacent the junction between the joints and the driven shaft and for slip movement on the driving shaft.

Another object of the invention is to provide a device of the character described wherein the joints are supported on a vertical axis fixed with respect to the tractor, and means are provided between the joints and the driving shaft for taking the slippage necessitated by angular movement of the joints so as to reduce the vibration, wear and power loss to a minimum, and also to reduce the overall length of the device.

Another object of the invention is to provide a structure of the character described in which the secondary loads due to the joints and reacting on the shafts can be supported close to the pivot points to avoid chatter and vibration therein due to flexing in the supports.

A further object of the invention is the provision of a structure of the character described having improved means for supporting the forward joint so as to substantially shorten the assembly and impart greater rigidity thereto by improved support of the forward yoke, the forward yoke being supported in an annular bearing in close proximity to the adjacent joint.

Other objects and advantages will become apparent from the following description and the accompanying drawing, in which—

Figure 1:
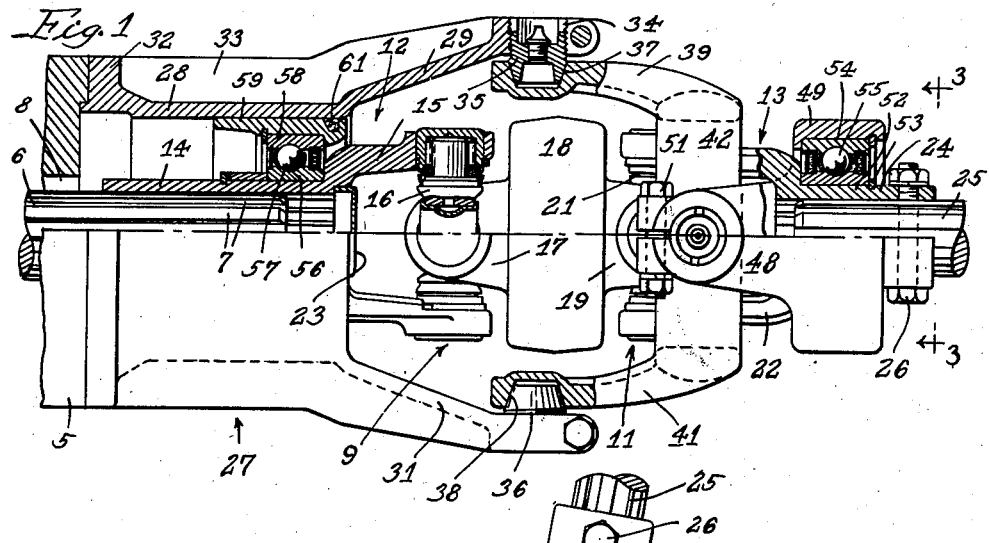
Figure 1 is a side view partly in section showing a power take-off assembly embodying my invention.

In the drawing the numeral 5 designates a portion of the conventional frame structure of a tractor or the like, this commonly being a part of the gear housing through which a shaft 6 projects in the form of a stub shaft and constituting a power take-off shaft from the tractor. According to the invention this shaft is splined as indicated at 7, in this instance the splines extending from the outer end thereof inwardly to a point beyond the housing 5, the housing having an opening 8 around the shaft.

Close coupled universal joints, indicated generally at 9 and 11, are arranged to be driven from the driving shaft 6 and may be of any of the well known types, in this instance they are of the so-called Cardon type and comprise a pair of yokes 12 and 13 disposed in coplanar relationship, the yoke 12 comprising an internally splined sleeve 14 and yoke arms 15, the latter being pivotally connected to a spider 16 which is in turn pivotally connected to spaced ears 17 on a transmission ring 18, the transmission ring having spaced ears 19 for pivotal attachment to a spider 21 to which yoke arms 22 of the yoke 13 are pivotally attached. It will be seen that the yoke 12, spider 16 and spaced ears 17 form one universal joint, while the yoke 13, spider 21 and ears 19 form a second universal joint, the two being connected by the transmission ring 18 which forms a transmission member between the two joints.

The internally splined sleeve 14 of the yoke 12 receives the driving or power take-off shaft 6 of the tractor, the interconnecting splines of the shaft 6 and sleeve 14 serving to transmit rotary motion from the shaft to the joint 9 and simultaneously permitting relative longitudinal movement between the shaft and the sleeve. The opening in the end of the sleeve 14 is closed by a cap 23 to prevent the entrance of dirt and foreign matter into the slidable driving connection between these elements. It will be understood that while the connection between the sleeve 14 and the shaft 6 is described and herein shown as a conventional spline connection, this may be any connection which will transmit rotary motion from the shaft to the yoke and will permit relative longitudinal movement between these members, many equivalent connections being well known in the art.

The yoke 13 of the joint 11 is also provided with an internally splined sleeve 24 adapted to receive the splined end of the driven shaft 25. It is contemplated that the driven shaft 25 shall be the shaft connecting the tractor with the trailed implement and functions for the purpose of providing a power drive for the mechanism carried on the implement. Commonly these driven shafts are connected to the gear box of the implement through a universal joint, and the shafts themselves are formed of telescoping parts so that the effective length thereof is automatically changed in response to angular movement between the tractor and the implement, all of which is well known in the art. The sleeve 24 and the shaft 25 are provided with openings for the passage of a bolt 26 which acts to fix the shaft to the yoke in relatively immovable relationship. It will be seen that many means may be employed for making this connection, but I prefer to employ some means whereby the shaft and the yoke may be easily disconnected for convenience in attaching the assembly to different trailing vehicles, and for this purpose the bolt and spline connection is suitable, though other satisfactory connections are known in the art.

It will be seen that the mechanism heretofore described acts to transmit the power from the driving shaft 6 to the forward end of the driven shaft 25, and permits of relative angular movement between the two shafts. However, means must be provided for supporting the joint and for causing the angular motion between the shaft to be properly distributed. This construction includes a support member designated generally by the numeral 27, in this instance the member being in the form of a sleeve 28 having outwardly disposed arms 29 and 31, the sleeve 28 encircling the driving shaft 6 in concentric relationship therewith. The support member has a flange 32 adapted for attachment of the support member to the frame 5 in rigid relation therewith, and the support member is provided with reinforcing ribs 33 of conventional design. The outer ends of the arms 29 and 31 are provided with threaded openings 34 for the reception of bearing members 35 and 36 having frusto-conical bearing surfaces 37 and 38 received in complementary openings in the ends of fingers 39 and 41, which are in turn attached to a collar 42, the fingers 39 and 41 and the complementary bearing surfaces providing for rotation of the collar about a vertical axis through the bearing members 35 and 36. The collar 42 has at opposite sides thereof frusto-conical bearing surfaces 43 and 44 adapted to receive complementary bearing surfaces on bearing pins 45 and 46 positioned in openings on the ends of ears 47 and 48, in this instance integral with a bearing housing 49 extending annularly of the yoke sleeve 24. The bearing members 35, 36, 45 and 46 are secured in their respective openings by means of bolts such as shown at 51 passing through opposed sides of split rings forming the ends of arms 29 and 31 and ears 47 and 48 and forming the openings for the reception of the bearing members as is well known in the art.

Positioned within the bearing housing 49 is a bearing consisting in this instance of an inner race 52 seated on the sleeve 24 and held against longitudinal movement by a snap ring 53 or other suitable means. An outer race 54 bears against the bearing housing, and an annulus of balls 55 is disposed therebetween in the conventional fashion. While this bearing is in this instance mounted on the sleeve of the yoke 13, it will be understood that this bearing can be mounted on the shaft 25 if desired, the essential thing being that the bearing be mounted rearwardly of the rearward joint so as to support the universal joints at this point and also so as to support the driven shaft. Numerous alterations may be made in which the bearing may have different mountings, but it is contemplated that these shall be equivalent constructions where the functions described are performed. It will also be seen that a further function of this bearing is to prevent longitudinal movement of the yoke 24 and to require the longitudinal movement necessitated by rotation of the joints about the vertical axis to occur between the sleeve 14 and the shaft 6. The particular arrangement of the bearing and sleeve 24 is of merit in that it maintains the overall length of the joint assembly at a minimum and permits of convenient removal and replacement of the shaft 25.

Bearing means is disposed between the yoke sleeve 14 and the support sleeve 28 for the purpose of guiding and supporting the forward yoke so as to prevent lateral movement of the yoke and prevent chatter and similar loss of energy at this point. This bearing in this instance includes an inner race 56 secured to the yoke sleeve 14 directly adjacent the arms 15, an annulus of balls 57 and an outer race 58, the outer race being fixed on a piston-like plunger 59 seated against the inner wall of the support sleeve 28 for longitudinal movement with respect thereto as the yoke moves longitudinally on the shaft 6. A packing 61 is disposed adjacent the outer end of the piston 59 so as to seal the interface against the loss of lubricant and so as to prevent the entrance of dirt into the bearing between the piston and the cylinder 28. It will be seen that as the yoke moves longitudinally on the shaft 6, the piston-like member 59 will slide in and out in the sleeve 28 and impart lateral support to the yoke, regardless of its position. It will also be noted that this bearing provides support for the forward end of the universal joint assembly in close proximity to the joint so as to reduce to a minimum any vibration which might tend to be set up by laterally directed forces. The opening 8 around the shaft 6 permits of movement of the yoke sleeve 14 through the frame 5 in extreme movements of the yoke. This construction permits the length of the joint assembly to be reduced to a minimum, and provides for a high degree of lateral support.

Figure 2:
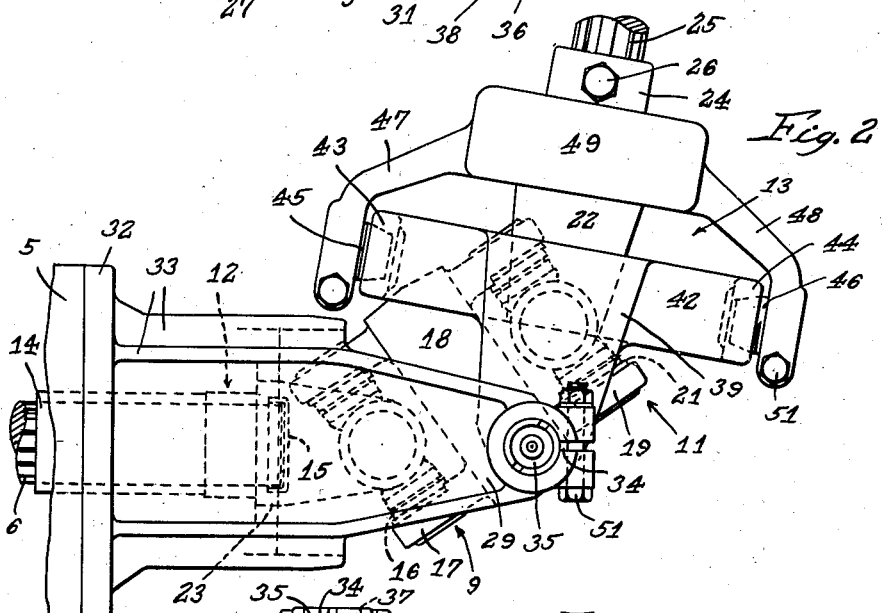
Fig. 2 is a top view thereof.
Figure 3:
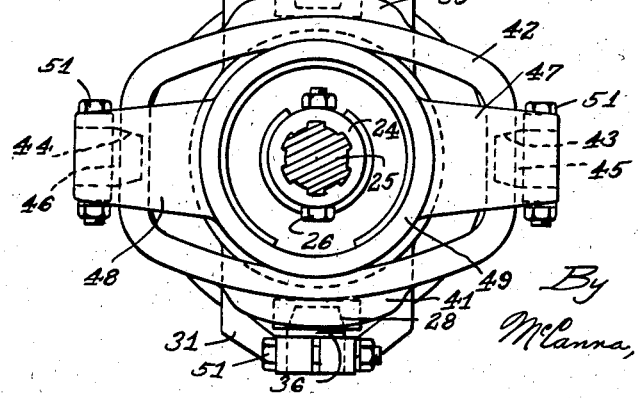
Fig. 3 is a view on the line 3—3 of Figure 1.

In the operation of the device, all of the mechanism except the shaft 25 is permanently attached to the frame of a tractor so that in effect the sleeve 24 forms a universal power take-off shaft for the tractor so that the connecting shaft of any trailing vehicle may be connected to this sleeve and proper drive conditions result. In this way, the multiplicity of devices heretofore used for transmitting power from the tractor to the trailing vehicle is eliminated, and this single power take-off assembly provides a universal drive for all implements. As heretofore described, in use the shaft 25 of the trailing implement is fixedly attached to the sleeve 24 by the bolt 26, the conventional hitch of the trailer is attached to the hitch of the tractor, and the combined device is ready for operation. It will be seen that the support for the universal joint assembly and for the driven shaft is essentially through the bearing 55, the ears 47 and 48, the collar 42, fingers 39 and 41, and support member 27 to the frame of the tractor. Rotation of the drive shaft 6 causes rotary motion to be transmitted through the yoke 12, the spider 16, the transmission ring 18, the spider 21, and the yoke 13 to the driven shaft 25. It will be seen that when a turning movement occurs as between the tractor and the trailing implement, angularity develops between the driving shaft 6 and the driven shaft 25, the bearing 55 moving with the shaft 25 through rotation of the fingers 39 and 41 about the center of the bearing members 35 and 36, longitudinal movement simultaneously occurring between the sleeve 14 and the shaft 6. Since the center line of the bearing members 35 and 36 intersects the normal center line of the transmission ring or connecting member 18 slightly forward of the center thereof, the angles of the yokes 12 and 13 with respect to the axis of rotation of the transmission ring will be substantially equal, as will be seen from Fig. 2.

The pivotal connections provided by the bearings 45 and 46, it will be observed, permit relative angular movement between the shafts in a vertical plane and are located slightly to the rear of the axis of the spider 21 to thereby provide a maximum degree of angular displacement between the shafts in a horizontal plane. It will be understood that the relative angular movements of the shafts in a vertical plane is normally caused by unevenness or variation in the surface of the ground over which the tractor and implement travel. Since these variations are relatively small, comparatively small differences in angularity will exist and the pivotal support for such movement can therefore be located rearwardly of the spider 21 to obtain the advantages above described.

Attention is directed to the fact that the sliding movement in the drive system occasioned by angular movement of the shafts is taken between the drive shaft 6 and the sleeve 14 directly adjacent the frame of the tractor in which the looseness necessitated by the sliding fit produces a minimum of chatter and lateral movement of the parts in response to changes in the secondary loads on the joint. It will also be observed that the bearing 57 supports the forward end of the joint against such chatter and lateral movement in close proximity to the joint so as to substantially prevent such action. Furthermore, because of the fact that the bearing 55 is tightly fit on and permanently located with respect to the driven shaft and the yoke 13 and is supported in close proximity to the pivot points, a more rigid and smooth running structure is provided. Furthermore, this permits the bearing to be brought closer to the center of the joint and its supports. Another feature of the invention is the fact that the only relative movement occurring between the sleeve 14 and the shaft 6 is longitudinal movement, which movement is relatively small in degree and does not cause substantial wear in case the complemental surfaces become contaminated with dirt, as would be the case should rotary motion also be present in this connection.

An important feature of the invention is in the provision of longitudinal sliding movement disposed between the shaft 6 and the yoke 12, together with bearing means acting between a yoke and a stationary part of the structure designed to take the force occasioned by changes in the secondary loads on the joint.

I have divorced the position of the hitch point of the draw bar from the position of the universal joints, which makes it unnecessary to have the draw bar pivot pin substantially half-way between the joints, which is necessary with present common practice, in order to obtain substantially constant angular velocity in the driven shaft.

While I have described and illustrated a specific embodiment of the invention, I do not wish to be limited except as required by the scope of the appended claims, in which—

I claim:

1. The combination with a tractor of a power take-off assembly for driving a trailing vehicle comprising a driving shaft on said tractor, a driven shaft adapted for transmitting power drive for mechanism carried on the trailing vehicle, a pair of close coupled universal joints having a forward yoke for driving connection to said driving shaft and a rearward yoke for driving connection to said driven shaft, means fixedly attached to the tractor for supporting said rearward yoke to rotate on an arc of a circle about a fixed vertical axis with change in angularity of said shafts in a horizontal plane, a sliding driving connection between said forward yoke and said driving shaft for relative longitudinal movement therebetween with change in angularity of said shafts, and a fixed driving connection between said rearward yoke and said driven shaft.

2. The combination in a tractor power take-off assembly providing a close coupled drive unit between a driving shaft on the tractor and a driven shaft adapted for transmitting the drive to mechanism carried on a trailing vehicle, of a pair of close coupled front and rear universal joints, the front universal joint having a sliding driving connection with said driving shaft for longitudinal movement with respect thereto, the rear universal joint having a yoke shaped for connection to said driven shaft, a bearing supported on said yoke in longitudinally fixed relation thereto for support of said joints, and means positioned in fixed relation with said driving shaft for supporting said bearing for rotation about a horizontal and a vertical axis with relative angular movement of said yoke and said driving shaft.

3. The combination with a tractor of a power take-off assembly for driving a trailing vehicle comprising a driving shaft on said tractor, a driven shaft adapted for transmitting power drive for mechanism carried on the trailing vehicle, a pair of close coupled Cardan type universal joints having a forward yoke for attachment to said driving shaft and a rearward yoke for attachment to said driven shaft, means forming a fixed part of the tractor and including a bearing for supporting said rearward yoke for rotation on the arc of a circle about a fixed vertical axis disposed adjacent to the mid-point between said joints with change in angularity of said shafts in a horizontal plane to keep the angles between said joints approximately uniform at all relative positions of the tractor and trailing vehicle, said means including pivots for supporting said bearing for rotation on a horizontal axis, said bearing being fixed longitudinally with respect to said rearward yoke and said driven shaft in all positions, and a sliding driving connection between said forward yoke and said driving shaft for relative longitudinal movement therebetween with change in angularity of said shaft.

4. The combination with a tractor of a power take-off assembly for driving a trailing vehicle comprising a driven shaft connected to said vehicle, a driving shaft positioned on said tractor on a fixed center of rotation, a pair of close coupled front and rear universal joints each having oppositely disposed yokes, a slidable driving connection between the front yoke of the first universal joint and said driving shaft, means for fixedly connecting the rear yoke of the rear universal joint to said driven shaft to transmit rotation between said driving and driven shafts with change of angularity therebetween, and means for supporting said joints for angular movement between said shafts comprising a bearing disposed in fixed relation longitudinally with respect to said driven yoke in all positions thereof, and means for supporting said bearing for rotation about two axes at right angles to each other with relative angular movements of said driving and driven shafts.

5. The combination with a tractor of a power take-off assembly for driving a trailing vehicle comprising a driving shaft on said tractor, a driven shaft adapted for transmitting power drive for mechanism carried on the trailing vehicle, a pair of close coupled universal joints having a forward yoke for attachment to said driving shaft and a rearward yoke for attachment to said driven shaft, means fixedly attached to the tractor for supporting said rearward yoke to rotate on an arc of a circle about a fixed vertical axis with change in angularity of said shafts in a horizontal plane, a fixed driving connection between said rearward yoke and said driven shaft, a sliding driving connection between said forward yoke and said driving shaft for relative longitudinal movement therebetween with change in angularity of said shafts, and a bearing around said forward yoke to support the same for longitudinal movement.

6. The combination with a tractor of a power take-off assembly for driving a trailing vehicle comprising a driving shaft on said tractor, a pair of close coupled universal joints having a forward yoke for attachment to said driving shaft and a rearward yoke for attachment to a driven shaft, means fixedly attached to the tractor for supporting said rearward yoke to rotate on an arc of a circle about a fixed vertical axis with change in angularity of said shafts in a horizontal plane, a sliding driving connection between said forward yoke and said driving shaft for relative longitudinal movement therebetween with change in angularity of said shafts, a bearing on said forward yoke for imparting support thereto, and means for supporting said bearing for longitudinal movement with said yoke.

7. The combination with a tractor of a power take-off assembly for driving a trailing vehicle comprising a splined driving shaft on said tractor, a pair of close coupled universal joints having a forward yoke including a splined sleeve for reception of said driving shaft and spaced yoke arms, and a rearward yoke for attachment to a driven shaft, means fixedly attached to the tractor for supporting said rearward yoke to rotate on an arc of a circle about a fixed vertical axis with change in angularity of said shafts in a horizontal plane, a bearing on said sleeve in close proximity to said yoke arms, and means for supporting said bearing for longitudinal movement with said yoke to support the same against lateral movement.

8. The combination with a tractor of a power take-off assembly for driving a trailing vehicle comprising a splined driving shaft on said tractor, a pair of close coupled universal joints having a forward yoke including a splined sleeve for reception of said driving shaft and spaced yoke arms, and a rearward yoke for attachment to a driven shaft, means fixedly attached to the tractor for supporting said rearward yoke to rotate on an arc of a circle about a fixed vertical axis with change in angularity of said shafts in a horizontal plane, a bearing on said sleeve in close proximity to said yoke arms, and a sleeve fixed on a stationary part of said tractor in concentric relationship with said yoke sleeve receiving said bearing therein for longitudinal movement with said yoke to support the latter for longitudinal movement.

9. The combination with a tractor of a power take-off assembly for driving a trailing vehicle comprising a splined driving shaft on said tractor, a pair of close coupled universal joints having a forward yoke including a splined sleeve for reception of said driving shaft and spaced yoke arms, and a rearward yoke for attachment to a driven shaft, means fixedly attached to the tractor for supporting said rearward yoke to rotate on an arc of a circle about a fixed vertical axis with change in angularity of said shafts in a horizontal plane, a bearing on the sleeve of said forward yoke in close proximity to said yoke arms, a sleeve fixed on a stationary part of said tractor in concentric relationship with said yoke sleeve receiving said bearing therein for longitudinal movement with said yoke to support the latter for longitudinal movement, and a seal disposed between said bearing and said fixed sleeve for preventing egress of lubricant and entrance of dirt.

10. The combination in a tractor of a power take-off assembly for driving a trailing vehicle comprising a driving shaft on said tractor, a driven shaft adapted for transmitting power drive for mechanism carried on the trailing vehicle, a pair of close coupled front and rear universal joints, the first joint having a forward yoke for attachment to said driving shaft and the rear joint having a rearward yoke for attachment to said driven shaft, means fixedly attached to the tractor for supporting said rearward yoke to rotate on an arc of a circle about a fixed vertical axis with change in angularity of said shafts in a horizontal plane and also for rotation on a horizontal axis, said means comprising a support member around said driving shaft shaped for located reception against the frame of the tractor, said support member having rearwardly projecting arms disposed on opposite sides of said joints, a collar circumscribing said rear joint and having forwardly disposed arms pivoted on the arms of said support for rotation of said collar on a fixed axis, a bearing for supporting said rear joint disposed in fixed relation longitudinally with respect to said rearward yoke, and means for pivotally supporting said bearing on said collar for rotation on an axis transverse to the axis of rotation of said collar, a fixed driving connection between said rearward yoke and said driven shaft, a sliding driving connection between said forward yoke and said driving shaft for relative longitudinal movement therebetween with change in angularity of said shafts, and a bearing around said forward yoke carried in said support member to support said forward yoke for longitudinal movement on said driving shaft.

CARL E. SWENSON.